United States Patent [19]

Degen

[11] 4,267,319
[45] May 12, 1981

[54] COLORED POLYMERIC COMPOUNDS

[75] Inventor: Hans-Juergen Degen, Lorsch, Fed. Rep. of Germany

[73] Assignee: BASF Aktiengesellschaft, Fed. Rep. of Germany

[21] Appl. No.: 98,775

[22] Filed: Nov. 30, 1979

[30] Foreign Application Priority Data

Dec. 7, 1978 [DE] Fed. Rep. of Germany ....... 2852919

[51] Int. Cl.³ ................. C07D 401/06; C07D 401/14; C07D 403/06
[52] U.S. Cl. .................................... 542/434; 526/259; 526/265; 542/435; 542/450; 542/454; 542/457; 542/458; 162/162; 106/288 Q
[58] Field of Search ............... 542/434, 435, 450, 454, 542/457, 458; 526/259, 265; 162/162; 8/7

[56] References Cited

U.S. PATENT DOCUMENTS

| | | | |
|---|---|---|---|
| 3,810,872 | 5/1974 | Chapurlat et al. | 542/455 |
| 3,810,888 | 5/1974 | Chapurlat et al. | 542/455 |
| 3,888,850 | 6/1975 | Entschel et al. | 8/7 |
| 3,905,941 | 9/1975 | Jones | 526/259 |
| 3,931,319 | 1/1976 | Green et al. | 542/434 |

Primary Examiner—Arthur P. Demers
Attorney, Agent, or Firm—Oblon, Fisher, Spivak, McClelland & Maier

[57] ABSTRACT

Colored polymeric compounds of the general formula

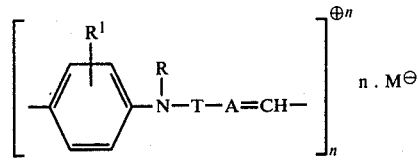

where A is the radical of a quaternized, methylene-active compound, R is unsubstituted or substituted alkyl, cycloalkyl or phenyl, $R^1$ is hydrogen, chlorine, bromine, hydroxyl, $C_1$-$C_4$-alkyl or $C_1$-$C_4$-alkoxy, T is alkylene which is unsubstituted or substituted by halogen, $C_1$-$C_4$-alkoxy or hydroxyl, or is a radical of the formula

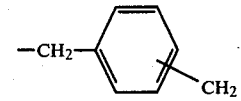

$M^\ominus$ is an anion and n is a number $>1$.

The compounds according to the invention are particularly suitable for coloring paper stock.

9 Claims, No Drawings

COLORED POLYMERIC COMPOUNDS

The present invention relates to compounds of the general formula I

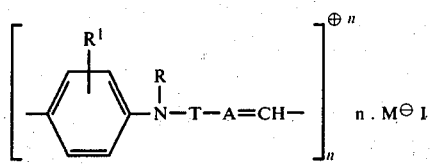

where A is the radical of a quaternized, methylene-active compound, R is unsubstituted or substituted alkyl, cycloalkyl or phenyl, $R^1$ is hydrogen, chlorine, bromine, hydroxyl, $C_1$–$C_4$-alkyl or $C_1$–$C_4$-alkoxy, T is alkylene which is unsubstituted or substituted by halogen, $C_1$–$C_4$-alkoxy or hydroxyl, or is a radical of the formula

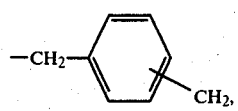

$M^\ominus$ is an anion and n is a number $>1$.

The radicals A are preferably of the general formula

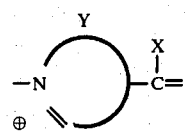

where X is hydrogen, unsubstituted or substituted $C_1$–$C_4$-alkyl, $C_1$–$C_4$-alkoxycarbonyl, cyano or unsubstituted or substituted carbamyl and Y is a structure which completes a heterocyclic ring, and X and Y can also conjointly form a carbocyclic ring.

Specific examples of radicals A are:

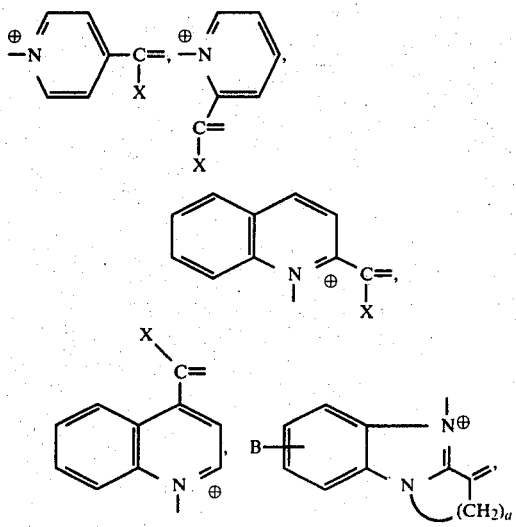

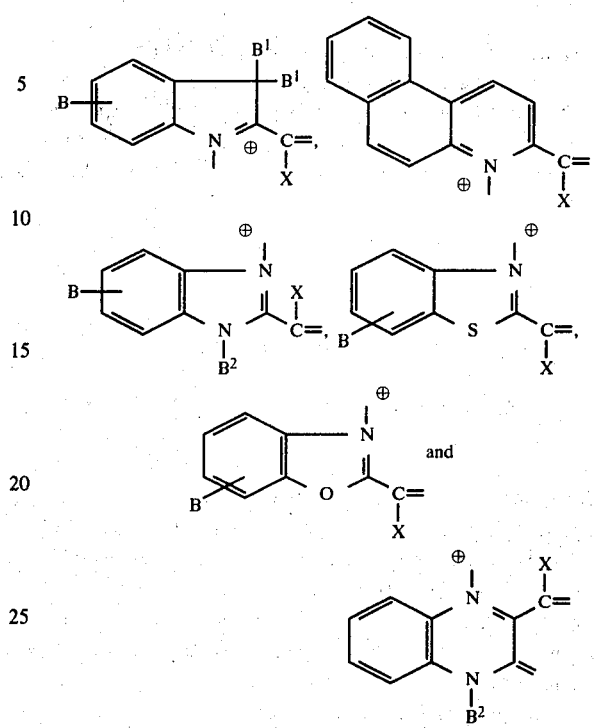

where a is 2, 3 or 4, B is hydrogen, unsubstituted or substituted $C_1$–$C_4$-alkyl, unsubstituted or substituted benzyl, $C_1$–$C_4$-alkoxy, halogen, $C_1$–$C_4$-alkylamino or di-$C_1$–$C_4$-alkylamino, nitro, $C_1$–$C_4$-alkoxycarbonyl, carbamyl or cyano, $B^1$ is unsubstituted or substituted alkyl, $B^2$ is unsubstituted or substituted $C_1$–$C_4$-alkyl or unsubstituted or substituted benzyl and X has the above meanings.

Examples of carbamyl radicals X are $CONH_2$, $CONHCH_3$, $CONHC_2H_5$, $CONHC_4H_9$, $CONHC_8H_{17}$,

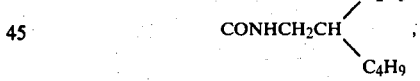

$CONHC_6H_5$, $CONHCH_2CH_2CH_2$ and $CONHCH_2CH_2N(CH_3)_2$ and the corresponding disubstituted radicals. Alkoxycarbonyl radicals X are in particular of 1 to 4 carbon atoms, examples being methoxycarbonyl, ethoxycarbonyl and butoxycarbonyl.

Examples of alkyl radicals R are $C_1$–$C_{12}$-alkyl, which may be substituted by chlorine, bromine, cyano, hydroxyl, $C_1$–$C_4$-alkoxy, amino, $C_1$–$C_4$-alkylamino or di-$C_1$–$C_4$-alkylamino, aryl, $C_1$–$C_4$-alkoxycarbonyl, carbamyl, N-mono-$C_1$–$C_4$-alkylcarbamyl or N,N-di-$C_1$–$C_4$-alkyl-carbamyl.

Specific examples of R are: methyl, ethyl, propyl, isopropyl, n-butyl, iso-butyl, benzyl, phenylethyl, methoxyethyl, ethoxyethyl, n- and iso-propoxyethyl, chloroethyl, bromoethyl, methoxycarbonylethyl, ethoxycarbonylethyl, dimethylaminoethyl, methylaminoethyl, aminoethyl, dimethylaminocarbonylethyl, aminocarbonylethyl, cyanoethyl, chloropropyl, chlorobutyl, 2-hydroxypropyl, 2-hydroxy-3-chloropropyl, aminocarbonylmethyl, cyanomethyl, cyclopentyl, cyclohexyl, cycloheptyl, phenyl, tolyl, chlorophenyl and methoxyphenyl.

Radicals R¹ are, in addition to hydrogen, chlorine and bromine, in particular methyl, ethyl methoxy, ethoxy, aminocarbonyl, methoxycarbonyl, ethoxycarbonyl and nitro.

Examples of alkylene radicals T are

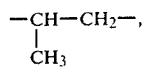

—(CH$_2$)$_3$—, —(CH$_2$)$_4$— and —(CH$_2$)$_5$—, and especially —C$_2$H$_4$—.

Examples of anions M$^\ominus$ are: fluoride, chloride, bromide, iodide, perchlorate, bisulfate, sulfate, aminosulfate, nitrate, dihydrogen phosphate, hydrogen phosphate, phosphate, bicarbonate, carbonate, methosulfate, ethosulfate, cyanate, thiocyanate, tetrachlorozincate, borate, tetrafluoborate, acetate, chloroacetate, cyanoacetate, hydroxyacetate, aminoacetate, methylaminoacetate, dichloroacetate, trichloroacetate, 2-chloropropionate, 2-hydroxypropionate, glycolate, thioglycolate, thioacetate, phenoxyacetate, trimethylacetate, valerate, palmitate, acrylate, oxalate, malonate, crotonate, succinate, citrate, methylene-bis-thioglycolate, ethylene-bis-iminoacetate, nitrilotriacetate, fumarate, maleate, benzoate, methylbenzoate, chlorobenzoate, dichlorobenzoate, hydroxybenzoate, aminobenzoate, phthalate, terephthalate, indolylacetate, chlorobenzenesulfonate, benzenesulfonate, toluenesulfonate, biphenylsulfonate and chlorotoluenesulfonate.

Examples of unsubstituted and substituted alkyl radicals B, B¹ and B² are those also mentioned for R. In substituted benzyl radicals, the substituents may, for example, be chlorine, methyl, ethyl, methoxy, ethoxy and cyano.

A compound of the formula I may be prepared, for example, by reacting a compound of the formula II

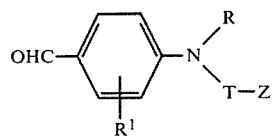

where Z is a group which can be split off as an anion, eg. Cl$^\ominus$, Br$^\ominus$, I$^\ominus$, CH$_3$SO$_4^\ominus$ or

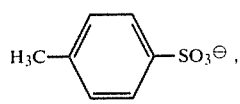

with a compound of the formula III

AH$_2$     III.

Compounds of particular importance are those of the formula Ia

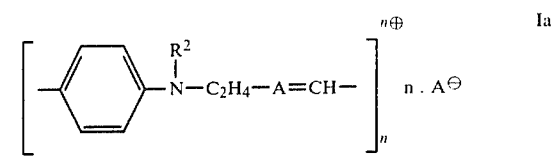

where R² is C$_1$–C$_4$-alkyl and A, M$^\ominus$ and n have the stated meanings.

Examples of preferred radicals A are

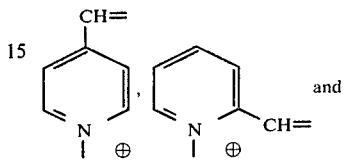

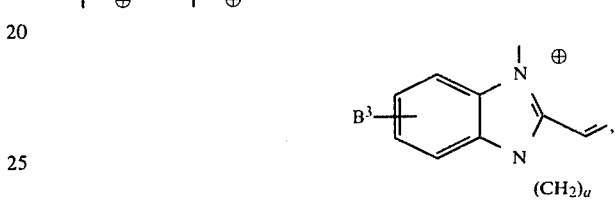

where B³ is hydrogen, chlorine or C$_1$–C$_4$-alkyl and a has the stated meanings.

Advantageously, the components, with or without a solvent, are heated to an elevated temperature, for example from 30° C. to 200° C., preferably from 60° to 150° C., and a condensing agent, such as an acid or a base, is then added. Specific examples of condensing agents are NaOH, KOH, MgO, Ca(OH)$_2$, primary, secondary and tertiary amines, HCl, HCOOH, CH$_3$COOH, toluenesulfonic acid, zinc chloride and mixtures, eg. NaOOCH$_3$/CH$_3$COOH or triethylamine/CH$_3$COOH.

Details of how the reaction is conducted may be found in the Examples, where parts and percentages are by weight, unless stated otherwise.

The compounds of the formula I are particularly suitable for coloring and printing paper; they exhibit high substantivity and high affinity, ie. the waste water is virtually colorless.

The degree of polymerization of the compounds greatly depends on the temperature settings used. The viscometric data of a 5 percent strength aqueous solution range from $$\frac{\eta}{c} \cong 0.05 \left[\frac{100 \text{ ml}}{g}\right] \text{ to } \frac{\eta}{c} = 0.3 \left[\frac{100 \text{ ml}}{g}\right],$$

with low $\eta/c$ values being found at low reaction temperatures and high $\eta/c$ values at high temperatures.

As a result of the method of synthesis, possible end groups of the compounds of the formula I are the radicals

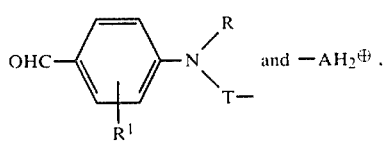

the reactive centers of which may or may not have been reacted further, for example the aldehyde group with malodinitrile or the —AH$_2^\oplus$ group with an aldehyde, eg. benzaldehyde.

In preparing the compounds of the formula I, it is of course also possible to react mixtures of compounds of the formula II and/or III with one another; in this way, it is possible to influence, for example, the hue and the solubility characteristics.

EXAMPLE 1

A solution of 21 g of N-ethyl-N-(2-chloroethyl)-p-aminobenzaldehyde and 10 g of γ-picoline in 50 ml of thiodiglycol is heated for 1 hour at 140° C. It is then cooled to 90° C., 10 ml of pyrrolidine are added and the batch is again heated for 1 hour at 140° C. 40 g of glacial acetic acid are then added to give a fluid formulation, of about 25 percent strength, of the dye of the formula (4)

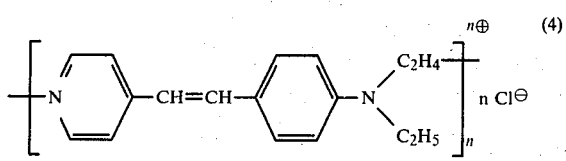

The dye is readily soluble in water and colors a mixture of 60% of groundwood and 40% of bleached sulfite cellulose in a red hue. The waste water is colorless. Other highly substantive dyes suitable both for paper containing groundwood, and for bleached and unbleached cellulose, are obtained on varying the reaction conditions as indicated in the Table which follows:

TABLE I

The amounts of chemicals employed are as in Example 1

| Temperature before addition of pyrrolidine (°C.) | Reaction time (h) | Addition of pyrrolidine at (°C.) | subsequent reaction temperature (°C.) | Time (h) |
|---|---|---|---|---|
| 170 | 0.3 | 90 | 140 | 1 |
| 160 | 0.5 | 90 | 90 | 1 |
| 140 | 1 | 60 | 60 | 2 |
| 150 | 1 | 70 | 70 | 2 |
| 140 | 0.2 | 80 | 80 | 2 |
| 140 | 0.5 | 60 | 60 | 1 |
| 140 | 0.3 | 60 | 80 | 1 |
| 130 | 1 | 80 | 80 | 1 |
| 130 | 0.5 | 80 | 80 | 1 |
| 130 | 2 | 60 | 60 | 2 |
| 130 | 0.2 | 80 | 80 | 1 |
| 130 | 4 | 60 | 60 | 1 |
| 120 | 2 | 80 | 80 | 2 |
| 120 | 4 | 60 | 70 | 2 |
| 120 | 6 | 60 | 60 | 2 |
| 110 | 4 | 90 | 90 | 2 |
| 110 | 8 | 60 | 70 | 1 |
| 110 | 12 | 70 | 70 | 1 |
| 140 | 1 | 90 | 130 | 1 |
| 140 | 1 | 90 | 120 | 1 |
| 140 | 1 | 90 | 110 | 1 |
| 140 | 1 | 90 | 100 | 1 |
| 140 | 1 | 90 | 90 | 1 |

The dyes are all red to reddish orange.

Fluid formulations of these and of all the dyes described in the subsequent Examples are obtained by adding water-soluble acids, such as dilute HCl, dilute H$_2$SO$_4$, glacial acetic acid, formic acid, acrylic acid or glyoxylic acid, and/or water, to the reaction mixtures. The substantivity of the dyes decreases slightly with decreasing reaction temperature, but, on the other hand, the brilliance of the dyeings increases. Suitable solvents for the reaction are not only glycol but a large number of other water-soluble organic solvents. Examples are methanol, ethanol, n- and iso-propanol, dihydric and polyhydric alcohols and their water-soluble partial or full ethers and esters, eg. propylene glycol, ethylene glycol monomethyl ether, ethylene glycol dimethyl ether, glycerol, glycerol monomethyl ether, glycol monoacetate and glycerol monoacetate, and water-miscible acid amines, eg. dimethylformamide or formamide, and solvents such as thiodiglycol and dimmethylsulfoxide.

The variations in temperature settings employed in Example 1 are typical of all the subsequent Examples, unless stated otherwise.

EXAMPLE 2

A solution of 21 g of N-ethyl-N-(2-chloroethyl)-p-aminobenzaldehyde and 10 g of γ-picoline in 50 ml of glycol is heated for 1 hour at 150° C. It is then cooled to 110° C., 50 g of glacial acetic acid and 5 g of piperidine are added and the batch is again heated at 120° C., this time for 3 hours. A reddish orange dye of the formula (4) is obtained, having similar properties to the dye described in Example 1. In this Example, again, the variation in the reaction temperature gives similar results to those of Example 1.

EXAMPLE 3

A solution of 21 g of N-ethyl-N-(2-chloroethyl)-p-aminobenzaldehyde and 10 g of γ-picoline in 50 ml of glacial acetic acid is heated for 1 hour at 140° C. 5 g of triethylamine are then slowly added dropwise at 90° C., and the mixture is refluxed for 6 hours. A fluid formulation of a dye of the formula (4) is obtained, which colors paper in brilliant orange hues.

EXAMPLE 4

The method described in Example 1, and the conditions of Table I, are followed, using 10 g of α-picoline instead of 10 g of γ-picoline. Orange dyes of the formula (5) are obtained.

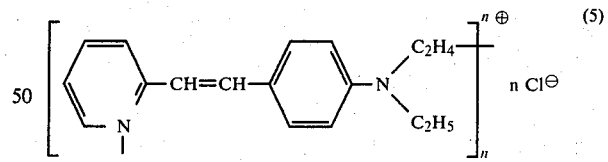

The dyes are readily soluble in water and color groundwood, bleached and unbleached cellulose, and mixtures of these pulps, in orange hues. The waste water is colorless or only slightly colored.

EXAMPLE 5

22 g of N-ethyl-N-(2-chloroethyl)-p-aminobenzaldehyde and 17 g of 6-methyl-pyrrolidino-[1,2-a]-benzimidazole are dissolved in 25 ml of thiodiglycol and the solution is heated at 140° C. for 2 hours. 10 g of pyrrolidine are then added and heating is continued for one hour at 70° C. On adding 50 ml of glacial acetic acid, a fluid formulation, of about 30 percent strength, of a yellow dye of the formula (6) is obtained:

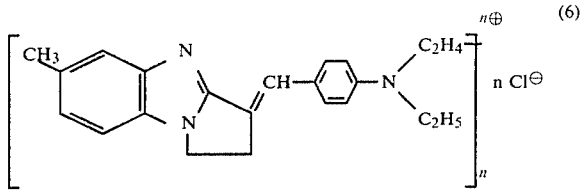

Varying the experimental conditions as in Example 1 also gives yellow, readily water-soluble dyes, the tinctorial properties of which are similar to those obtained under the conditions of Table I.

EXAMPLE 6

The reaction conditions described in Example 5 are followed, except that in place of 17 g of 6-methyl-pyrrolidino-[1,2-a]-benzimidazole 16 g of pyrrolidino-[1,2-a]-benzimidazole are used. Dyes of the formula (7)

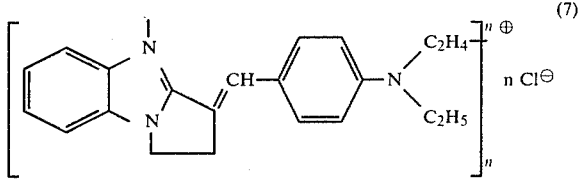

are obtained, which have similar properties to the dyes described in Example 5.

EXAMPLE 7

The reaction conditions described in Example 5 are followed except that instead of 17 g of 6-methyl-pyrrolidino-[1,2-a]-benzimidazole 20 g of 6-chloro-pyrrolidino-[1,2-a]-benzimidazole are used. Dyes of the formula (8)

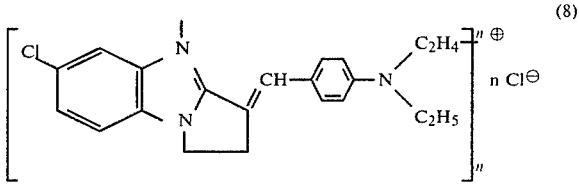

are obtained.

EXAMPLE 8

22 g of N-ethyl-N-(2-chloroethyl)-p-aminobenzaldehyde and 18 g of piperidino-[1,2-a]-benzimidazole are dissolved in 25 ml of glycol and the solution is heated for 2 hours at 140° C. It is then cooled to 90° C., 20 g of piperidine are added and the mixture is heated for 4 hours at 90° C. On adding glacial acetic acid, a fluid formulation of the dye of the formula (9)

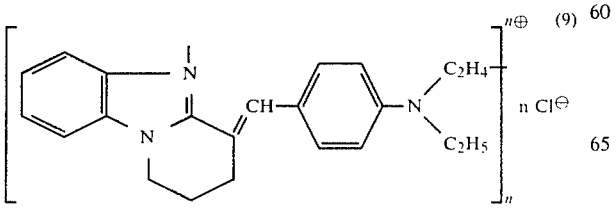

is obtained. The dye gives yellow hues on paper materials, with little color of the waste water.

The polymeric or oligomeric dyes already described in this test, and those which follow, can also be obtained as crystalline or amorphous powders. For example, this is achieved by pouring a reaction mixture containing a dye of the formula (4) into 200 g of water, precipitating the dye by adding a salt, for example NaCl, and filtering off and drying the product. The dye powders thus obtained are also suitable for coloring paper.

EXAMPLE 9

A solution of 24 g of N-methyl-N-(3-chloropropyl)-p-aminobenzaldehyde and 10 g of γ-picoline in 25 ml of glycol is heated for 2 hours at 150° C. It is then cooled to 70° C., 10 g of pyrrolidine are added and the batch is heated at 70° C. for 2 hours. On adding glacial acetic acid, a fluid formulation of a dye of the formula (10)

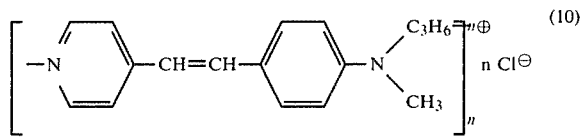

is obtained.

The following variations in the reaction parameters are made:

| Temperature before addition of pyrrolidine (°C.) | Reaction time (h) | Addition of pyrrolidine | | Time (h) |
| --- | --- | --- | --- | --- |
| | | at (°C.) | subsequent reaction temperature (°C.) | |
| 180 | 1 | 90 | 120 | 1 |
| 170 | 1 | 90 | 60 | 3 |
| 160 | 2 | 70 | 110 | 2 |
| 150 | 2 | 80 | 70 | 1 |
| 140 | 3 | 70 | 90 | 1 |
| 130 | 3 | 60 | 100 | 1 |
| 120 | 5 | 70 | 120 | 2 |
| 110 | 12 | 80 | 110 | 1 |
| 90 | 24 | 70 | 60 | 1 |

The properties of the dyes thus obtained are comparable with those obtained in Example 1.

EXAMPLE 10

The reaction conditions described in Example 9 are followed except that 25 g of N-methyl-N-(3-chloro-2-hydroxypropyl)-p-aminobenzaldehyde are used instead of 24 g of N-methyl-N-(3-chloropropyl)-p-aminobenzaldehyde. Dyes of the formula (11)

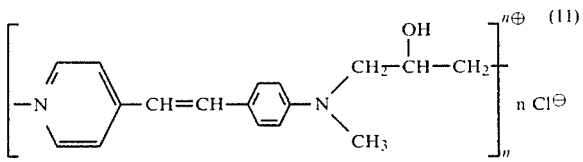

with similar tinctorial properties to the dyes of Example 9 are obtained. The dyes give orange red hues on paper.

EXAMPLE 11

A solution of 19 g of N-methyl-2-cyanomethylbenzimidazole and 21 g of N-ethyl-N-(2-chloroethyl)-p-aminobenzaldehyde in 25 ml of glycol is heated for 1 hour at 140° C. It is then cooled to 90° C., 5 ml of piperidine are added and the batch is heated for 3 hours at 110° C. On adding 30 g of formic acid, a fluid formulation of a yellow dye of the formula (13), which is suitable for coloring paper, is obtained.

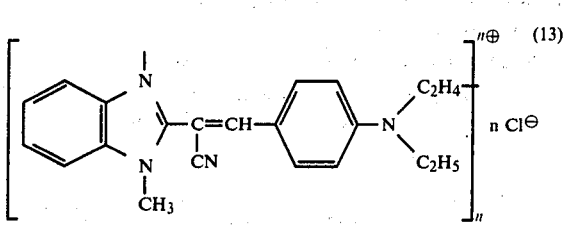

EXAMPLE 12

If in Example 12 the N-methyl-2-cyanomethylbenzimidazole is replaced by 19 g of 2-cyanomethylbenzthiazole, an orange dye of the structure (14)

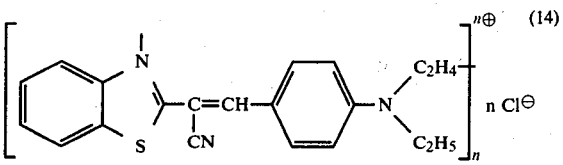

having similar tinctorial properties is obtained.

EXAMPLE 13

If in Example 12 the N-methyl-2-cyanomethylbenzimidazole is replaced by 19 g of 2-cyanomethylbenzoxazole, an orange dye of the structure (15)

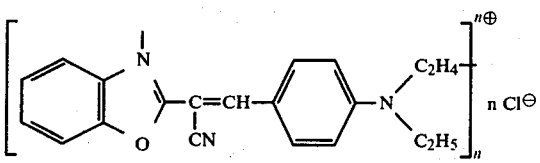

having similar tinctorial properties is obtained.

EXAMPLE 14

A solution of 9 g of γ-picoline, 2 g of pyrrolidino-[1,2-a]-benzimidazole and 21 g of N-ethyl-N-(2-chloroethyl)-p-aminobenzaldehyde in 25 ml of glycol is heated for 1 hour at 140° C. and then cooled to 80° C., 10 ml of pyrrolidine are added and the batch is heated for 2 hours at 80° C. On adding 50 ml of glacial acetic acid, a fluid formulation, of about 30 percent strength, of an orange dye is obtained. The hue of the dye is comparable with that of a mixture of 90% of the dye from Example 1 (prepared under the same reaction conditions) and 10% of the dye from Example 6 (prepared under the same reaction conditions). It is reasonable to assume that the chemical structure is that of a copolymer of the structures of Examples 1 and 6, though the presence of homopolymers of the structures in question cannot be ruled out.

A shift in hue can be achieved by varying the ratio of the components employed, but might also be achieved by mixing the individual pure dyes. The dyes thus obtained are readily water-soluble, and the waste water obtained when coloring paper is colorless or only slightly colored. Examples of variations of the reactant ratio:

| % of the reactant from Example 1 | % of the reactant from Example | | Hue |
| --- | --- | --- | --- |
| 10 | 90 | 5 | reddish yellow |
| 20 | 80 | 6 | reddish yellow |
| 30 | 70 | 5 | orange |
| 40 | 60 | 5 | orange |
| 50 | 50 | 6 | orange |
| 60 | 40 | 6 | orange |
| 70 | 30 | 6 | orange |
| 80 | 20 | 6 | orange |

EXAMPLE 15

A solution of 14.2 g of quinaldine and 21 g of N-methyl-N-(2-chloroethyl)-p-aminobenzaldehyde in 25 ml of glycol is heated for 2 hours at 140° C. The temperature is then lowered to 60° C., 15 ml of pyrrolidine are added and the batch is heated at 60° C. for 2 hours. On adding 20 ml of glacial acetic acid and 10 ml of water, a fluid formulation of a reddish violet dye of the structure (16)

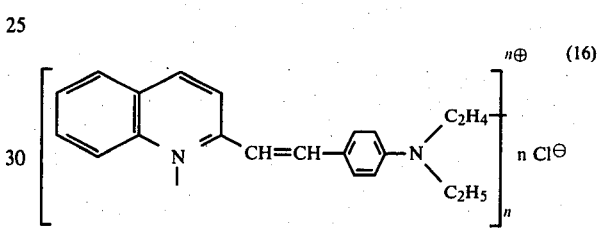

is obtained. The dye may be used for coloring paper.

EXAMPLE 16

A solution of 14.2 g of quinaldine and 21 g of N-methyl-N-(2-bromoethyl)-p-aminobenzaldehyde in 25 ml of glycol is heated for 1 hour at 140° C. Thereafter, the procedure of Example 16 (sic) is followed. The dye thus obtained is readily soluble in water, and its hue and tinctorial properties are similar to those of the dye from Example 16 (sic).

EXAMPLE 17

If, in Examples 16 and 17, 14.2 g of 4-methylquinoline are employed instead of quinaldine, dyes of the structure (17) are obtained, which have a slightly more bluish violet hue, but otherwise possess similar tinctorial properties, and are readily soluble.

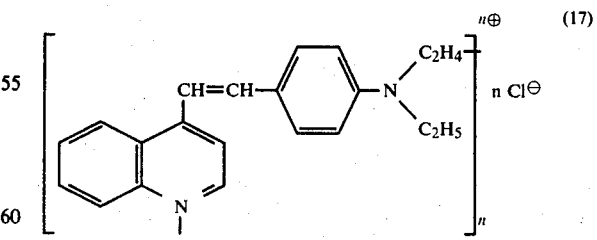

EXAMPLE 18

50 g of waste paper containing wood pulp are converted to a fiber suspension in one liter of water at room temperature (12° German hardness) and the suspension is then diluted to 2 liters with water of the same hardness. 10 g of a 2 percent strength aqueous solution of the dye from Example 1 are added and the batch is stirred for 2 minutes. The stock is then diluted with water to give an 0.5 percent strength suspension. Paper sheets weighing 100 g/m² are made therefrom by conventional methods and exhibit a bright orange color, with very good fastness to bleeding. The waste water is colorless.

EXAMPLE 19

150 g of powdered waste paper (containing wood pulp), 250 g of bleached groundwood and 100 g of unbleached sulfite cellulose are converted to a 3 percent strength aqueous suspension in a beater, and the suspension is diluted to 2% strength with water and mixed with 0.5% of soluble, oxidatively degraded corn starch and 5% of kaolin. 10 g of a 5 percent strength aqueous solution of the dye from Example 1 are then added and the mixture is stirred for 2 minutes. Paper sheets weighing 80 g/m² are then produced by conventional methods, for example using a laboratory sheet-former from Franck; the sheets are dyed orange and have very good fastness to bleeding. The waste water is colorless.

EXAMPLE 20

5 ml of a 1 percent strength solution of the dye from Example 5 are added to 1,000 g of a 2.5 percent strength suspension of a mixture of 60% of groundwood and 40% of unbleached sulfite cellulose in water and the batch is then stirred for 1 minute. A paper sheet weighing 80 g/m² is then made from the suspension by conventional methods. The paper has a deep yellow hue and very good fastness to bleeding. The waste water is only slightly colored.

EXAMPLE 21

5 ml of a 1 percent strength solution of the dye from Example 6 are added to 1,000 g of a 2.5 percent strength suspension of bleached sulfite cellulose in water, and the mixture is stirred for 1 minute. A paper sheet weighing 50 g/m² is then produced. The paper exhibits an intense greenish yellow hue, with very good fastness to bleeding. The waste water is only very slightly colored.

The saturation of end groups referred to on page 6 can also be utilized to obtain particular color shades.

If, for example, when carrying out the synthesis of the dye of Example 1 3 grams of the compound of the formula

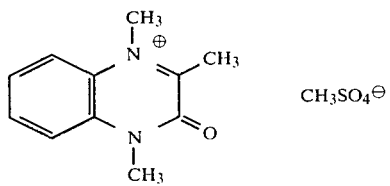

CH₃SO₄⁻ are added to the reaction mixture before or after the addition of glacial acetic acid, a condensation with the terminal aldehyde groups of the polymeric dye takes place, to give a compound in which the hue is shifted towards reddish brown, and which exhibits good affinity for papers produced from bleached and unbleached sulfite cellulose and papers containing wood pulp.

To produce a shift in shade it is possible to use, quite generally, methylene-active compounds which on condensation with a p-amino-benzaldehyde give colored compounds, which have a different hue to that of the compounds whose shade is to be varied.

The compounds containing carbonyl groups can similarly be used for varying the shade, provided the compounds concerned give condensation products differing in color from the original products. Thus, for example, a shift in hue towards red is achieved by adding 2 grams of p-dimethylaminobenzaldehyde to the reaction mixture of Example 5 at 60° C., before the addition of glacial acetic acid.

I claim:

1. A colored polymeric compound of the formula:

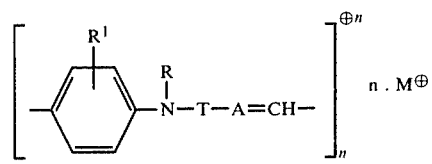

wherein A is a radical of the formula:

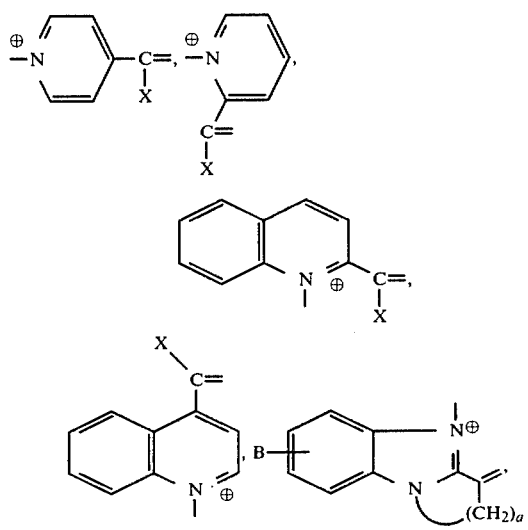

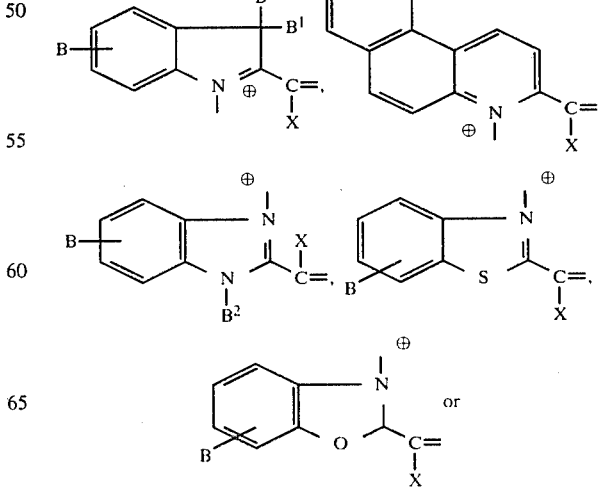

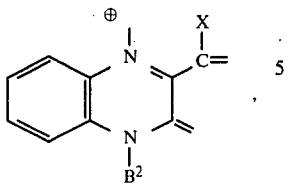

wherein a is 2, 3, or 4, B is hydrogen, unsubstituted or substituted $C_1$–$C_4$-alkyl, unsubstituted or substituted benzyl, $C_1$–$C_4$-alkoxy, halogen, $C_1$–$C_4$-alkylamino or di-$C_1$–$C_4$-alkylamino, nitro, $C_1$–$C_4$-alkoxycarbonyl, carbamyl or cyano, $B^1$ is unsubstituted or substituted alkyl, $B^2$ is unsubstituted or substituted $C_1$–$C_4$-alkyl or unsubstituted or substituted benzyl and X is the same as the radicals of groups B and $B^1$; R is unsubstituted or substituted alkyl, cycloalkyl or phenyl; $R^1$ is hydrogen, chlorine, bromine, hydroxyl, $C_1$–$C_4$-alkyl or $C_1$–$C_4$ alkoxy; T is alkylene which is unsubstituted or substituted by halogen, $C_1$–$C_4$ alkoxy or hydroxyl, or is a radical of the formula:

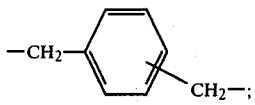

$M^\oplus$ is an amion and n is a number $> 1$.

2. The compound as claimed in claim 1, of the formula

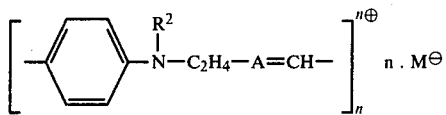

where $R^2$ is $C_1$–$C_4$-alkyl and A, $M^\ominus$ and n have the stated meanings.

3. The compound as claimed in claim 1, wherein said radical X is a carbamyl radical selected from the group consisting of $CONH_2$, $CONHCH_3$, $CONHC_2H_5$, $CONHC_4H_9$, $CONHC_8H_{17}$,

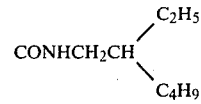

$CONHC_6H_5$, $CONHCH_2CH_2CH_3$, $CONHCH_2CH_2N(CH_3)_2$ and the corresponding disubstituted radicals.

4. The compound as claimed in claim 1, wherein said radical X is an alkoxycarbonyl of 1 to 4 carbon atoms.

5. The compound as claimed in claim 1, wherein said radical R is $C_1$–$C_{12}$-alkyl, which may be substituted by chlorine, bromine, cyano, hydroxyl, $C_1$–$C_4$-alkoxy, amino, $C_1$–$C_4$-alkylamino or di-$C_1$–$C_4$-alkylamino, aryl, $C_1$–$C_4$-alkoxycarbonyl, carbamyl, N-mono-$C_1$–$C_4$-alkylcarbamyl or N,N-di-$C_1$–$C_4$-alkyl-carbamyl.

6. The compound as claimed in claim 1, wherein said radical R is methyl, ethyl, propyl, isopropyl, n-butyl, iso-butyl, benzyl, phenylethyl, methoxyethyl, ethoxyethyl, n- and iso-propoxyethyl, chloroethyl, bromoethyl, methoxycarbonylethyl, ethoxycarbonylethyl, dimethylaminoethyl, methylaminoethyl, aminoethyl, dimethylaminocarbonylethyl, aminocarbonylethyl, cyanoethyl, chloropropyl, chlorobutyl, 2-hydroxypropyl, 2-hydroxy-3-chloropropyl, aminocarbonylmethyl, cyanomethyl, cyclopentyl, cyclohexyl, cycloheptyl, phenyl, tolyl, chlorophenyl or methoxyphenyl.

7. The compound as claimed in claim 1, wherein said radical T is —CH($CH_3$)—$CH_2$—, —($CH_2$)$_3$—, —($CH_2$)$_4$— or —($CH_2$)$_5$—.

8. The compound as claimed in claim 3, wherein said anion $M^\ominus$ is fluoride, chloride, bromide, iodide, perchlorate, bisulfide, sulfate, aminosulfate, nitrate, dihydrogen phosphate, hydrogen phosphate, phosphate, bicarbonate, carbonate, methosulfate, ethosulfate, cyanate, thiocyanate, tetrachlorozincate, borate, tetrafluoborate, acetate, chloroacetate, cyanoacetate, hydroxyacetate, aminoacetate, methylaminoacetate, dichloroacetate, trichloroacetate, 2-chloropropionate, 2-hydroxypropionate, glycolate, thioglycolate, thioacetate, phenoxyacetate, trimethylacetate, valerate, palmitate, acrylate, oxalate, malonate, crotonate, succinate, citrate, methylene-bis-thioglycolate, ethylene-bis-iminoacetate, nitrilotriacetate, fumarate, maleate, benzoate, methylbenzoate, chlorobenzoate, dichlorobenzoate, hydroxybenzoate, aminobenzoate, phthalate, terephthalate, indolylacetate, chlorobenzenesulfonate, benzenesulfonate, toluenesulfonate, biphenylsulfonate or chlorotoluenesulfonate.

9. The compound as claimed in claim 1, wherein said radical $R^1$ is hydrogen, chlorine bromine, methyl, ethyl, methoxy or ethoxy.

* * * * *